United States Patent Office 2,817,987
Patented Dec. 31, 1957

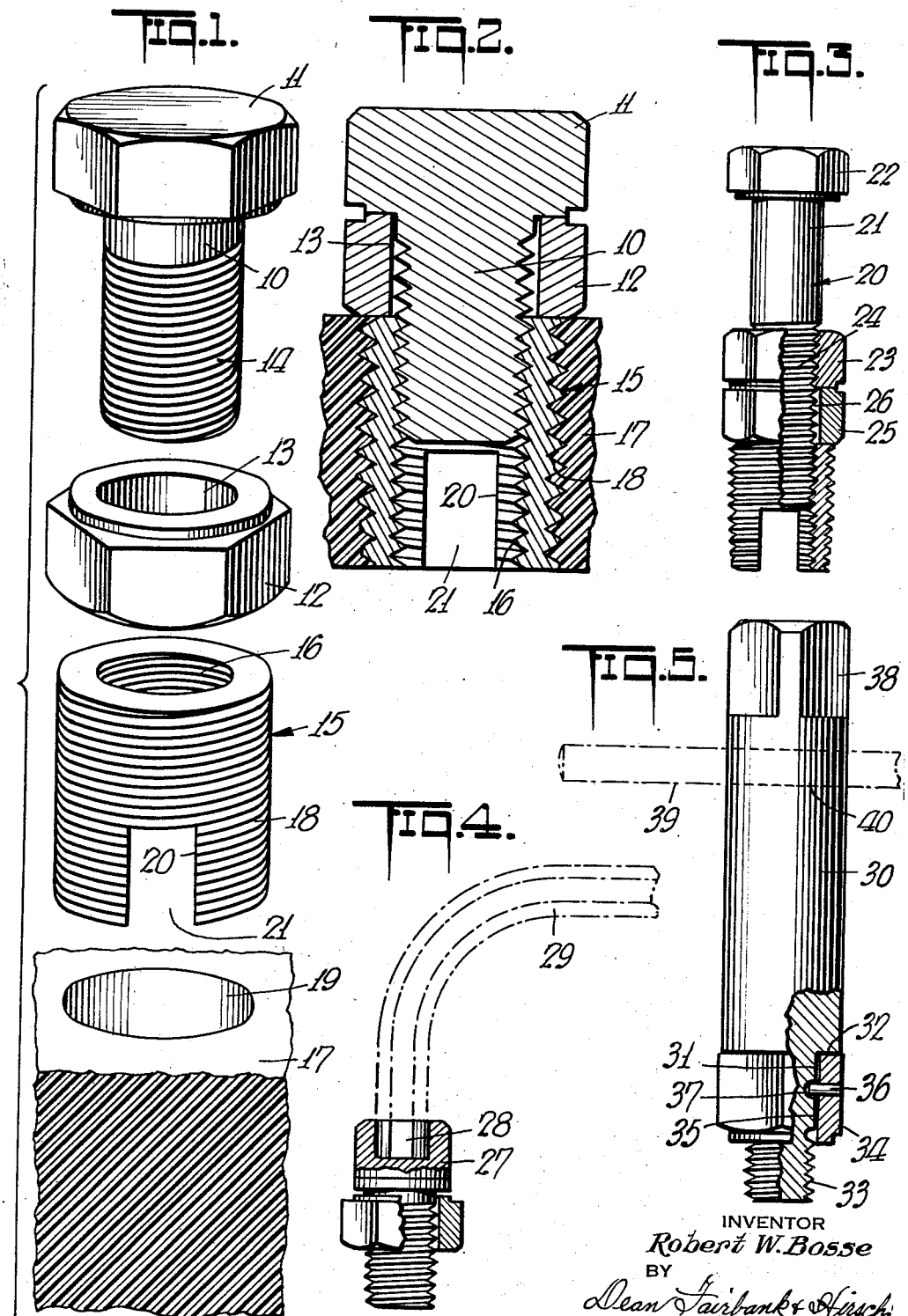

2,817,987

DRIVER TOOL FOR THREADED INSERTS

Robert W. Bosse, North Bergen, N. J., assignor to Groov-Pin Corporation, a corporation of New York Application October 15, 1954, Serial No. 462,435

5 Claims. (Cl. 81—53)

The present invention relates to positive release driver tools for threaded inserts, whether of the self-tapping character or otherwise, of the type to be introduced into relatively soft material such as plastic or soft metal for the accommodation of screws or bolts that would not be lodged with adequate security directly in the soft work piece.

It is among the objects of the invention to provide a driver tool of the character noted which is extremely simple, light, compact and inexpensive in construction, and which is yet extraordinarily positive in action, even where the friction lock between the insert and the work piece in which it is mounted is relatively low.

In the accompanying drawings in which are shown one or more of various possible embodiments of the several features of the invention, Fig. 1 is a dropped perspective view showing the two elements of the simplest embodiment of driver tool according to the invention, an insert, as well as the work piece in which the insert is to be installed by the tool, Fig. 2 is a view in longitudinal cross-section, of the embodiment of Fig. 1, showing the insert installed, but the tool still in place, Fig. 3 is a side elevation, partly in longitudinal cross-section, showing a modified simple form of tool with a longer shank, and showing an insert in place thereon, preparatory to its installation in a work piece, Fig. 4 is a view similar to Fig. 3, showing an Allen wrench arrangement for applying torque thereto, and Fig. 5 is a side elevation, partly in section, of another embodiment of the invention.

Referring now to the drawings, Figs. 1 and 2 show a conventional short bolt 10 with a hexagonal head 11. Encompassing the threaded shank of said bolt is a nut 12, desirably hexagonal, the threads of which have been drilled out to afford a cylindrical bore 13, which freely rides over the crests of the threads 14 on the shank of the bolt.

This extremely simple unit, composed as it is of two simple standard hardware elements, viz., a bolt and a nut, with a modification of the latter performed by a simple machining operation, may be used for applying an insert, such for instance, as that shown at 15. The insert is shown as a cylinder of hard or hardened metal internally threaded at 16 to accommodate a screw (not shown), to be carried in the work piece 17, generally of plastic or shoft metal, in which it is to be installed and externally threaded at 18 for accommodation in such work piece. The insert 15 is readily threaded upon the free end of the bolt 10, which protrudes beyond the nut 12 that encompasses the bolt, into the work piece 17, whether such work piece has been pre-tapped to accommodate the insert or whether it has merely been bored or cored as shown at 19, in which latter case the insert is of the self tapping character, illustratively with cutting edges 20 in notches 21 at its entry end, such as shown for instance in the prior U. S. patent to Erich Theurer, No. 2,455,885, granted December 7, 1948.

It will be apparent that in applying torque to the head 11 of bolt 10 by a suitable wrench of the socket or other type, the thrust will be transmitted through the nut 12 to the insert 15 with the nut 12 tightly engaging the outer end of the insert, when the insert has been threaded home.

To remove the tool from the insert after it has thus been applied, a suitable conventional open ended wrench (not shown), may be applied about the nut 12 to grip the same against turning for a short while when the bolt 10 is being turned in reverse or unscrewing direction. After but one-eighth to one-fourth turn of the bolt, the nut 12 will have been completely loosened with respect to the insert 15, so that in the continued reverse turning of the bolt, the tool will be removed, without any danger of the insert backing out from the work piece.

When there is occasion to remove the installed insert from the work piece, the same tool may be applied to the work piece by threading the same in until the nut 12 is firmly jammed against the end of the insert 15. Upon now turning the bolt in reverse direction (without using the conventional wrench to grip the nut that had been used in removing the tool in initial installation of the insert), the friction between the nut and the insert will be sufficient to cause the insert to be backed out from the work piece with the tool as desired.

The embodiment of Fig. 3 is similar to that of Figs. 1 and 2, except that the bolt 20 is of greater length, presenting an unthreaded outer portion 21 adjacent its head 22 and a coacting conventional nut 23 about the uppermost portion of the thread 24 to serve as the abutment for the nut 25, the threads of which are drilled out to afford a smooth bore as at 26, in the same manner as those of nut 12 in the embodiment of Figs. 1 and 2. In all other respects, the tool of Fig. 3 is similar to and is used in the same manner as that of Figs. 1 and 2.

The embodiment of Fig. 3 thus permits the use of the conventional longer bolt 20, should the shorter bolt 10 not be available.

The tool of Fig. 4 differs from that of Fig. 1 only in providing a bolt head 27 with a small square axial socket 28 therein for accommodating an Allen wrench 29 to apply the torque in installation of the insert and in removal of the tool.

In the embodiment of Fig. 5, a cylindrical shank 30 is used in place of the bolt. This shank has a reduced end 31 beyond a shoulder 32 from which end 31 protrudes, the threaded extremity 33 to accommodate the threaded insert to be installed. Encompassing the reduced shank portion 31 and adjacent threaded extremity 33, is a nut 34 similar to nut 12 of Fig. 1, the thread of which has been drilled away, so that its bore 35 may ride freely over said reduced shank 31. A radial pin 36 affixed in the nut 34 protrudes inwardly into a peripheral grove 37 about the reduced shank extremity 31.

The outer end of the shank 30 may be of angular form, as at 38, to accommodate a socket wrench, or alternatively, may have a socket (not shown) for an Allen wrench for operating the same as in the embodiment of Fig. 4. Alternatively, as indicated in dot and dash lines, a removable rod 39 may protrude from opposite ends of a diametral bore 40 through the shank near its outer extremity.

The embodiment of Fig. 5, though unlike those of Figs. 1 to 3, not made of substantially standard hardware parts, is yet of low cost, and has the advantage that it presents a unitary one-piece assembly, as distinguished from separate nut and bolt elements.

The mode of use of the embodiment of Fig. 5 will be the same as that of the embodiment of Figs. 1 and 2 above described, and therefore need not be further described.

In various embodiments shown, the driver will be reliably removed from the work piece after installation of the insert, without the slightest tendency for the insert to back out from the work piece in such removal, and this is true even though the friction holding the insert in place is considerably less than one-fifth the driving torque exerted in its installation. The conventional wrench used in holding the nut against rotation at the very beginning of the removing of the driver tool affords this assurance, which is absent from more elaborate driver tools previously in use.

It will thus be seen that the release driver for inserts in each of the embodiments shown is of extremely simple, compact and inexpensive construction as compared to driver tools for the purpose of the type in common use. The embodiments of Figs. 1 to 3 are of utmost simplicity consisting as they do, each of one or two conventional pieces of hardware, with an associated nut that departs from conventional merely in the drilling out of its internal thread. The tool is of utility not only to the professional mechanic but is ideal as a component of low-cost home workshop kits. Yet the operation in each case is positive, both in driving the insert in place and in assuring its maintenance in place while removing the tool therefrom and these embodiments are of utility in withdrawing an insert from the work piece, should there be occasion to do so for purposes of inspection or replacement.

As many changes could be made in the above construction and many apparently widely different embodiments of this invention could be made without departing from the scope of the claims, it is intended that all matter contained in the above description, or shown in the accompanying drawings, shall be interpreted as illustrative and not in a limiting sense.

Having thus described my invention, what I claim as new and desire to secure by Letters Patent of the United States is:

1. A positive release driver for inserts, comprising a shank threaded at one end for accommodating an insert to be installed, a sleeve having a smooth bore therethrough freely encompassing the shank, said sleeve having a smooth surface at one end thereof to engage the outer end of such insert, said shank having an enlarged means concentric therewith to abut the other end of said sleeve and means for the application of torque thereto for installing the insert in a work piece and removal of the driver.

2. A positive release driver comprising a threaded rod having an enlarged head at one end and an unthreaded portion near its head, a first nut threaded upon said bolt to fixed position determined by said unthreaded portion, a second nut about the threaded portion of said bolt, said second nut being devoid of an inner thread and riding freely about said bolt and having one end abutting the first nut and having a smooth surface on its other end, the bolt extending beyond said two nuts and affording a threaded mount for an insert to be installed.

3. A positive driver for inserts, said driver comprising a shank having an enlarged head and torque applying facilities near the outer end thereof, said shank having a threaded extremity for accommodating the insert to be installed, and having a cylindrical portion adjacent thereto of diameter smaller than that of the main length of the shank, a nut member devoid of thread and freely encircling said reduced shank portion, said nut having a smooth end surface, a pin affixed in said nut member and extending radially inward, and in said reduced shank portion having a peripheral groove accommodating the end of said pin, whereby an insert screwed upon the threaded extremity of the shank may be applied in a work piece by torque applied to the shank, and the driver then may be removed therefrom by unscrewing the same while gripping the nut member to prevent its rotation during a short unscrewing turn of the tool, thereby to loosen the nut member with respect to the insert, for ready unscrewing of the tool from the insert without backing of the same out of the work piece.

4. A positive release driver for inserts comprising a bolt and a nut, said bolt including a shank threaded at one end and having an enlarged head at the other end, said nut being devoid of an inner thread and freely encompassing the threaded shank of the bolt, said nut having a smooth end surface, said bolt having stop means to engage the nut to press the smooth end surface thereof against the outer end of an insert threaded upon said one end of the bolt, whereby the insert may be driven into a work piece by applying torque to the head of the bolt and the bolt may thereupon be removed by turning in the reverse direction while gripping the nut to prevent its rotation during a short turn of the bolt so that the driver may thereafter be unscrewed without backing out of the insert from the work piece.

5. A positive release driver for inserts comprising a rod having a threaded end for accommodating an insert to be installed, said rod being threaded beyond said insert mounting end and having an encompassing member, said encompassing member having a bore and being freely slidable upon said rod, said encompassing member having a smooth end adapted to engage the insert, means on said rod engaging said encompassing member to press the same against said insert, and means on the outer end of said rod for the application of torque thereto, said encompassing member having means on the exterior thereof for application of a wrench to inhibit movement thereof with the rod member when required.

References Cited in the file of this patent

UNITED STATES PATENTS

| | | |
|---|---|---|
| 1,785,847 | Valentine | Dec. 23, 1930 |
| 2,013,923 | Naccarato | Sept. 10, 1935 |
| 2,083,092 | Richer | June 8, 1937 |
| 2,550,866 | Rosan | May 1, 1951 |
| 2,684,606 | Brawley | July 27, 1954 |